(12) United States Patent
Chen

(10) Patent No.: US 6,655,470 B1
(45) Date of Patent: Dec. 2, 2003

(54) SPEED CHANGING MECHANISM FOR TOOLS

(75) Inventor: Ting-Kuang Chen, Keelung (TW)

(73) Assignee: Power Network Industry Co., Ltd. (TW)

( * ) Notice: Subject to any disclaimer, the term of this patent is extended or adjusted under 35 U.S.C. 154(b) by 0 days.

(21) Appl. No.: 10/325,926

(22) Filed: Dec. 23, 2002

(51) Int. Cl.[7] ............................................... F16H 3/74
(52) U.S. Cl. ..................... 173/47; 173/217; 173/216; 475/265; 475/320
(58) Field of Search ........................... 173/47, 216, 217, 173/48; 310/47, 50; 475/265, 290, 298, 299, 317, 320

(56) References Cited

U.S. PATENT DOCUMENTS

| | | | | |
|---|---|---|---|---|
| 5,897,454 A | * | 4/1999 | Cannaliato | ............... 475/265 |
| 6,086,502 A | * | 7/2000 | Chung | ..................... 475/299 |
| 6,142,242 A | * | 11/2000 | Okumara et al. | ......... 173/216 |
| 6,431,289 B1 | | 8/2002 | Potter et al. | |

\* cited by examiner

Primary Examiner—Scott A. Smith
(74) Attorney, Agent, or Firm—Birch, Stewart, Kolasch & Birch, LLP

(57) ABSTRACT

A speed changing mechanism includes two planetary gear sets and a movable gear that is controlled to be movably engaged with one of the two planetary gear sets to generate two different speeds. A third speed can be output when the movable gear is moved to a position where the movable gear is not engaged with either of the two planetary gear sets.

2 Claims, 6 Drawing Sheets

US 6,655,470 B1

SPEED CHANGING MECHANISM FOR TOOLS

FIELD OF THE INVENTION

The present invention relates to a three-speed speed changing mechanism that includes two planetary gear sets and a movable gear is controlled to be engaged with one or the two or both of the two planetary gear sets so as to obtain three different speeds.

BACKGROUND OF THE INVENTION

A conventional electric tools, especially for those tools have a rotating output shaft such as electric drills, are equipped with a speed reduction mechanism so as to provide different speeds and torque. In general, the speed reduction mechanism uses a planetary gear set and an input shaft is engaged with a chosen gear such as the sun gear, the inner gear, or the planet gears so that different speeds can be obtained. Nevertheless, due to the limited space in the casing of the tools, only two speeds can be obtained by the mechanism, and the speeds and torque are not satisfied by the users.

The present invention intends to provide a speed changing mechanism that outputs three different speeds by movably engaging a movable gear between two planetary gear sets.

SUMMARY OF THE INVENTION

In accordance with one aspect of the present invention, there is provided a speed changing mechanism which comprises a base in which a first planetary gear set and a second planetary gear set are respectively received. An input device and an output device are also received in the base. A movable gear is received in the base and has bosses which are movably engaged with protrusions in the base and a ring member of the input device. The planet gears of the two planetary gear sets are respectively engaged with the input gear of the input device. The movable gear is movably engaged between the two planetary gear sets. A push button controls the movable gear so as to engage the desired gears to output two different speed. When the movable gear is positioned in dependent from the two planetary gear sets, a third speed can be obtained.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
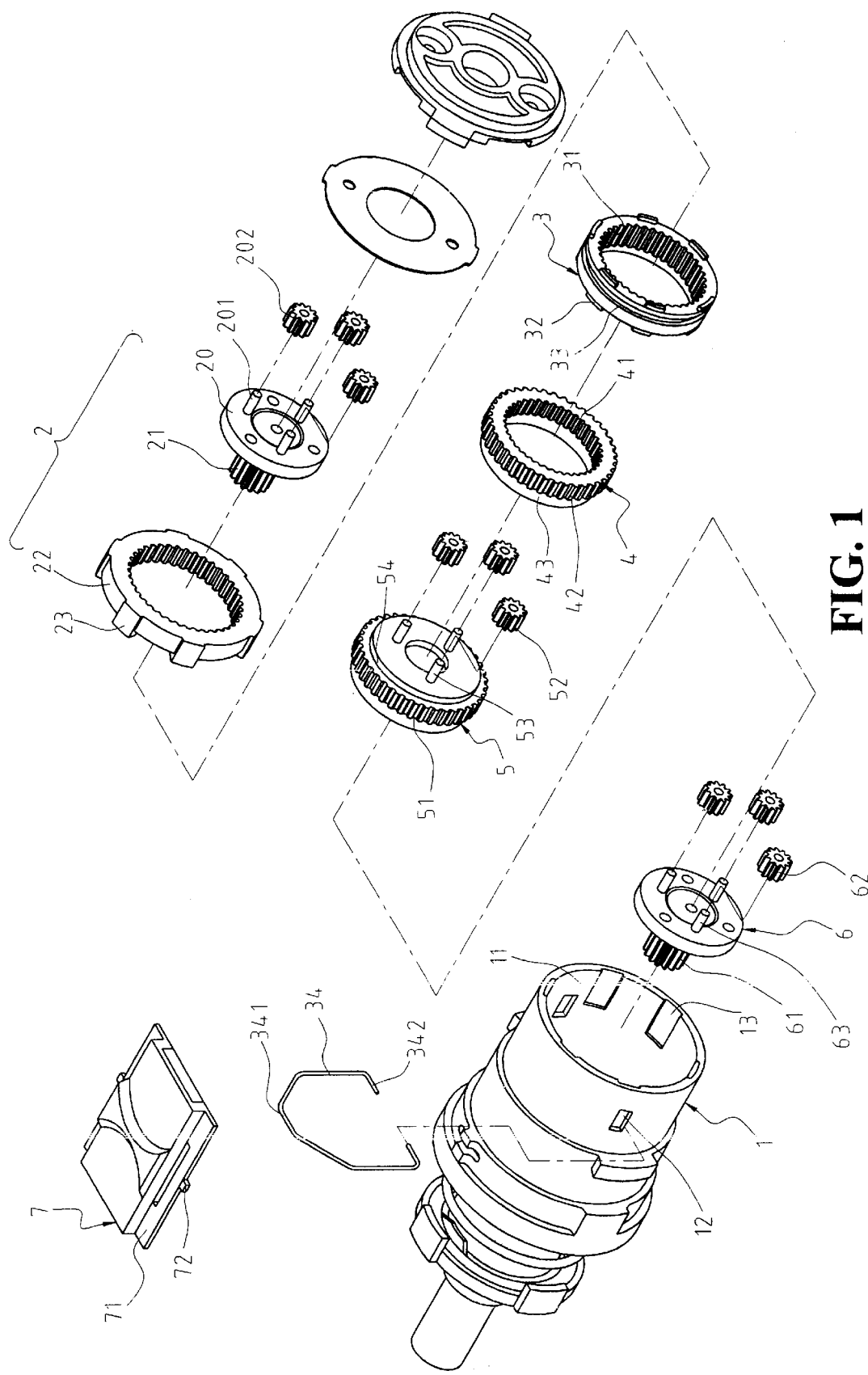
FIG. 1 is an exploded view to show the speed changing mechanism of the present invention.
Figure 2:
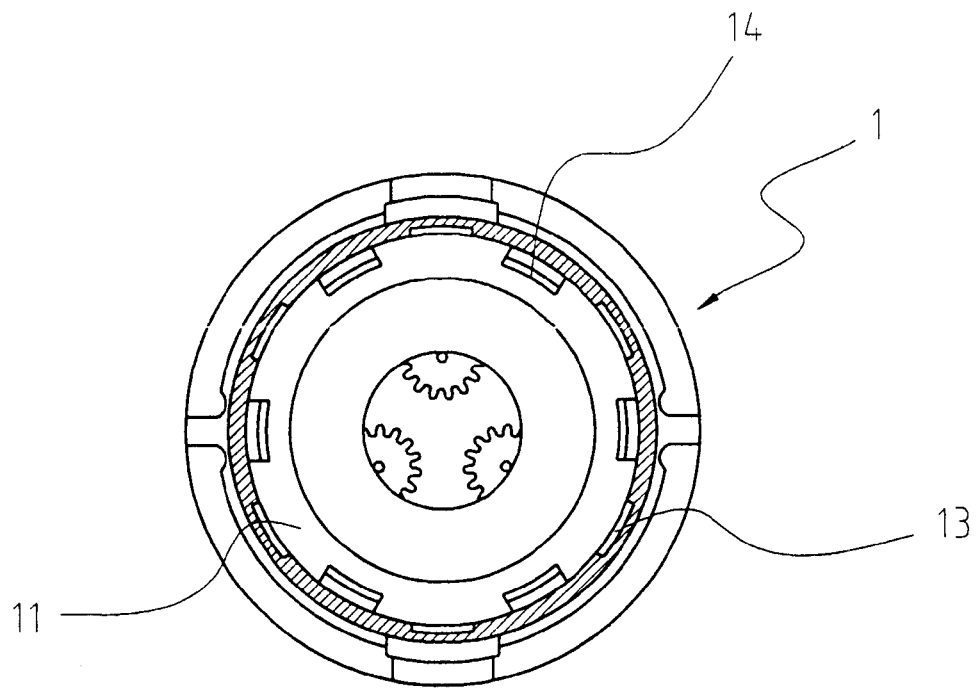
FIG. 2 is an end cross sectional view to show the base with the mechanism received therein.
Figure 4:
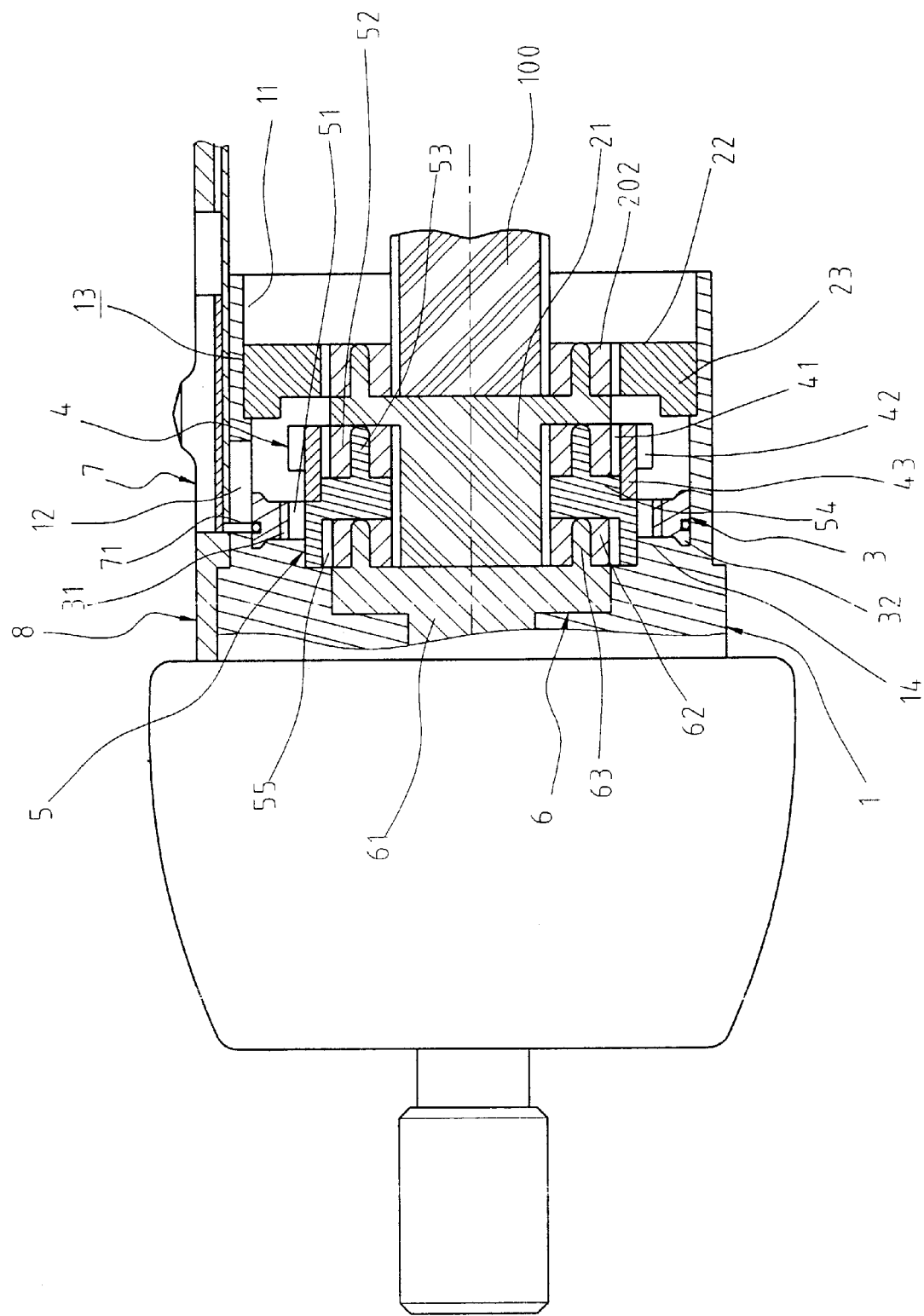
FIG. 4 shows the movable gear is positioned at the first position.

Referring to FIGS. 1 and 4, the speed changing mechanism of the present invention comprises a base 1 which is a tubular case and has a receiving chamber 11 defined in an end thereof and a plurality of first protrusions 14 as shown in FIG. 2, extend from an inner periphery of the chamber 11. A plurality of recesses 13 are defined in the inner periphery of the receiving chamber 11 and communicate with the open end of the base 1.

A first planetary gear set includes a first disk 6 which has a plurality of first planet gears 62 rotatably mounted onto three rods 63 extending from a first side of the first disk 6. An output shaft 61 extends from a second side of the first disk 6.

A second planetary gear set includes a second disk 5 which has first outer teeth 51 and a plurality of second planet gears 52 are rotatably mounted to three rods 53 extending from a convex portion 54 on a first side of the second disk 5. First inner teeth 55 are defined in a second side of the second disk 5.

A ring-shaped inner gear 4 has second inner teeth 41 and second outer teeth 42. The convex portion 54 of the second disk 5 is engaged in a neck portion 43 extending from a side of the inner gear 4.

A ring-shaped movable gear 3 has third inner teeth 31 and a plurality of bosses 32 extend from two respective edges of the movable gear 3. A groove 33 is defined in an outer periphery of the movable gear 3.

A third planetary gear set includes a third disk 20 which has a plurality of third planet gears 202 rotatably mounted to three rods 201 extending from a first side of the third disk 20 and an input shaft 21 extends from a second side of the third disk 20.

The first planet gears 62 and the second planet gears 52 are respectively engaged with the input shaft 21.

A ring member 22 has fourth inner teeth 221 and a plurality of second protrusions 23 extending radially outward from an outer periphery of the ring member 22. The second protrusions 23 of the ring member 22 are engaged with the recesses 13 of the base 1. The third planet gears 202 are engaged with the fourth inner teeth 221 of the ring member 22 and a driving shaft member 100 as shown in FIG. 4. The ring member 22 and the input shaft 21 are called as an input device 2 which transfers input power into the speed changing device.

The first planet gears 62 engaged with the first inner teeth 55 f the second disk 5 and the second planet gears 52 are engaged with the second inner teeth 41 of the inner gear 4.

Figure 3A:
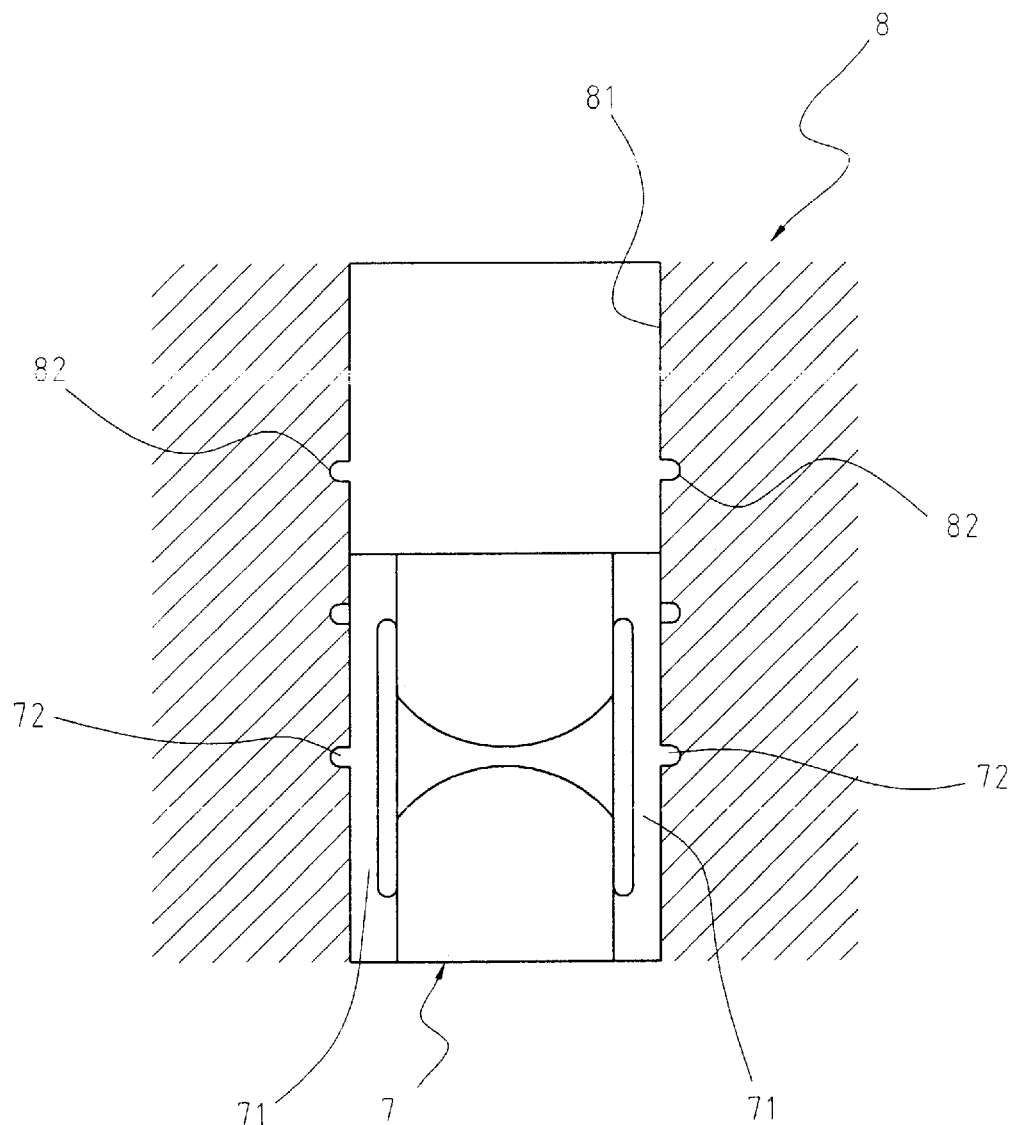
FIG. 3A shows the push button is positioned one of three positions of the body in which the speed changing mechanism is received.
Figure 3B:
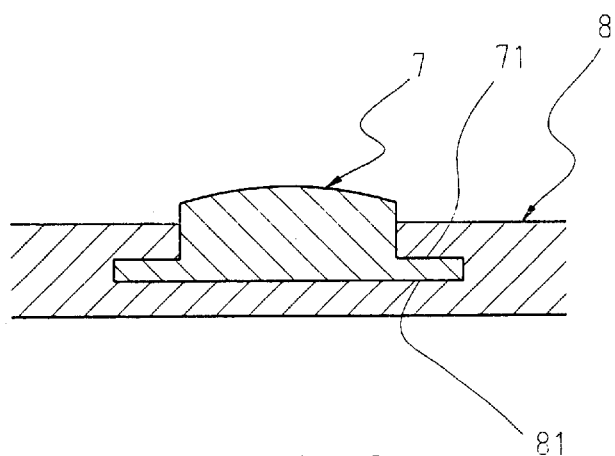
FIG. 3B shows an end cross sectional view of the push button in the body.

Further referring to FIGS. 3A and 3B, an engaging member 34 has two distal ends 342 which are inserted into holes 12 defined through the wall of the base 1 and engaged with the groove 33. A push button 7 is connected to a top section 341 of the engaging member 34. The push button 7 includes two flanges 71 which are slidably engaged with two sides of a rail 81 defined in a body 8. Three notches 82 are defined in each of the two sides of the rail 81 and each flange 71 has a positioning protrusion 72 which is engaged with one of the three notches 82 so as to position the push button 7. By moving the push button 7, the movable gear 3 can be shifted.

The movable gear 3 can be moved to be engaged with the first outer teeth 51 of the second disk 5 as shown in FIG. 4, the bosses 32 are engaged with the first protrusions 14 in the chamber 11 and the third inner teeth 31 are engaged with the first outer teeth 51. The input force drives the second planet gears 52 of the second disk 5 and the planet gears 62 of the first disk 6. The inner gear 4 is rotated by the second planet gears 52 and the first disk 6 is rotated by the first inner teeth 55 which drive the first planet gears 62. The output shaft 63 outputs a force.

Figure 5:
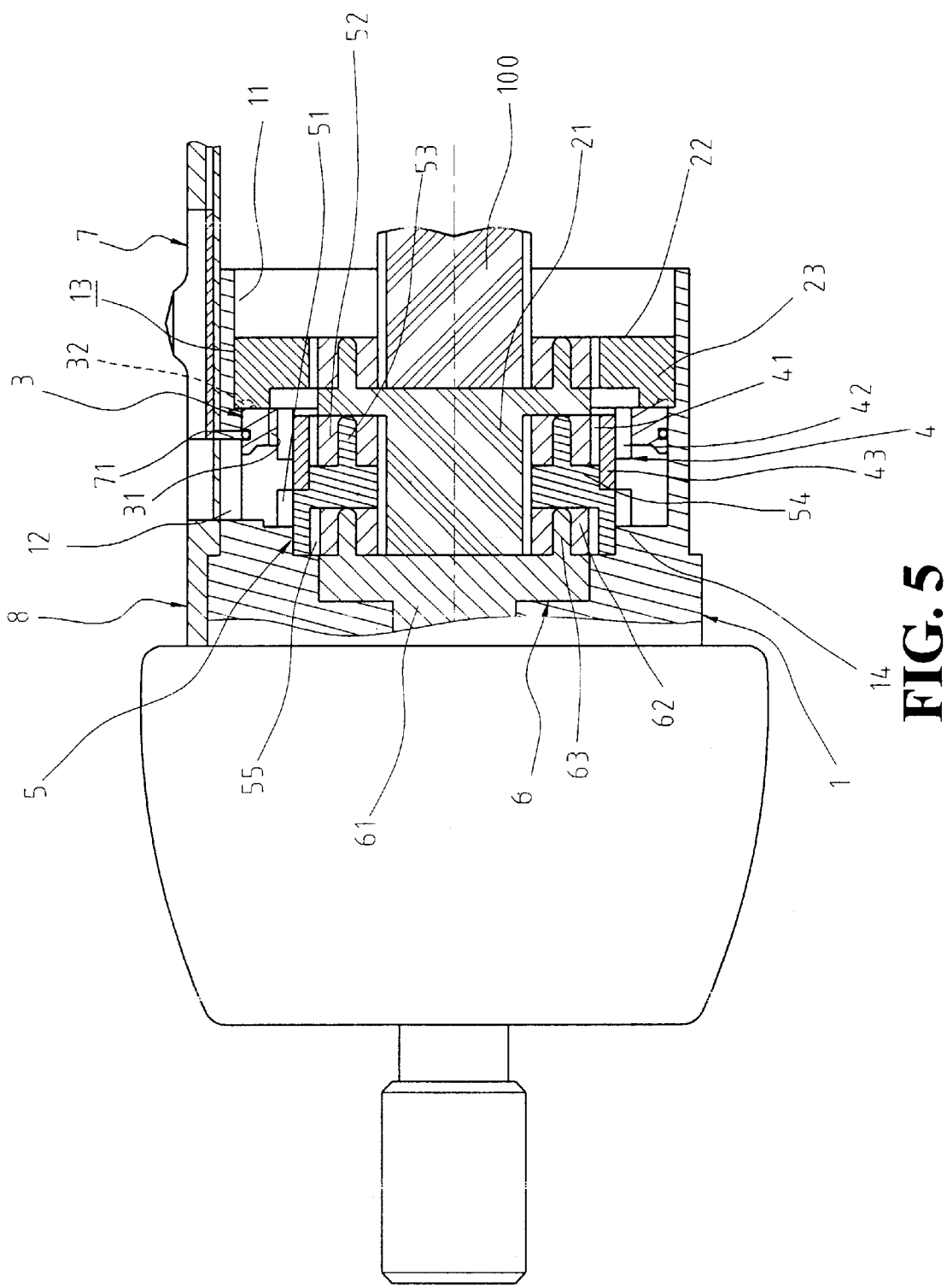
FIG. 5 shows the movable gear is positioned at the second position.

As shown in FIG. 5, when the push button 7 is shifted to another position where the movable gear 3 is shifted such that the bosses 32 are engaged with the second protrusions 23 of the ring member 22. The third inner teeth 31 are engaged with the second outer teeth 42 such that the input force drives the second planet gear 52 and the first planet gears 62. The second disk 5 is driven by the engagement of the second inner teeth 41 and the second planet gears 52, and the first disk 6 is rotated by the engagement of the first planet gears 62 and the first inner teeth 55. The output shaft 61 outputs a force.

Figure 6:
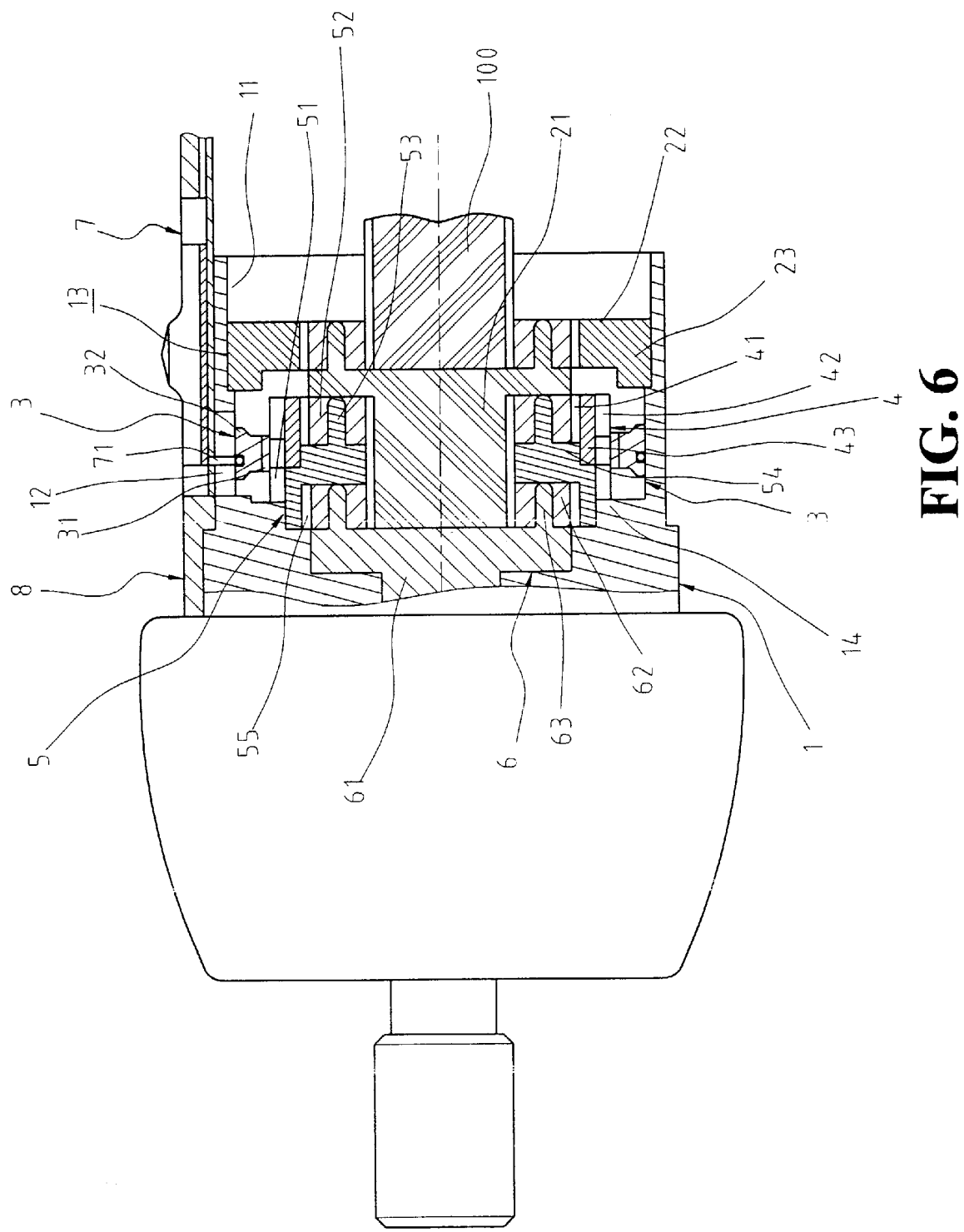
FIG. 6 shows the movable gear is positioned at the third position.

As shown in FIG. 6, when the push button 7 is pushed to a mediate position where the bosses 32 of the movable gear 3 are not engaged with any of the second protrusions 23 and the first protrusions 14. The third inner teeth 31 are engaged with the first outer teeth 51 and the second outer teeth 42 simultaneously. The inner gear 4 and the second disk 5 are co-rotated with the movable gear 3. The input force drives the second planet gears 52 and the first planet gears 62 directly. The first disk 6 is rotated by the engagement of the first planet gears 62 and the first inner teeth 55. The output shaft 61 outputs a force. The three output forces are different in speed and torque.

While we have shown and described the embodiment in accordance with the present invention, it should be clear to those skilled in the art that further embodiments may be made without departing from the scope of the present invention.

What is claimed is:

1. A speed changing mechanism comprising:

a base (1) having a receiving chamber (11) and a plurality of first protrusions (14) extending from an inner periphery of the chamber (11);

a first planetary gear set including a first disk (6) which has a plurality of first planet gears (62) rotatably connected to a first side of the first disk (6), an output shaft (61) extending from a second side of the first disk (6);

a second planetary gear set including a second disk (5) having first outer teeth (51) and a plurality of second planet gears (52) rotatably connected to a first side of the second disk (5), first inner teeth (55) defined in a second side of the second disk (5);

a ring-shaped inner gear (4) having second inner teeth (41) and second outer teeth (42);

a ring-shaped movable gear (3) having third inner teeth (31) and a plurality of bosses (32) extending from two respective edges of the movable gear (3), a groove (33) defined in an outer periphery of the movable gear (3) and an engaging member (34) engaged with the groove (33), a push button (7) connected to the engaging member (34);

a third planetary gear set including a third disk (20) which has a plurality of third planet gears (202) rotatably connected to a first side of the third disk (20), an input shaft (21) extending from a second side of the third disk (20) and the first planet gears (62) and the second planet gears (52) respectively engaged with the input shaft (21);

a ring member (22) having fourth inner teeth (221) and second protrusions (23) extending from an outer periphery of the ring member (22), the third planet gears (202) engaged with the fourth inner teeth (221) of the ring member (22); and the first planet gears (62) engaged with the first inner teeth (55) of the second disk (5) and the second planet gears (52) engaged with the second inner teeth (41) of the inner gear (4), the movable gear (3) movably engaged with the first outer teeth (51) of the second disk (5) or the second outer teeth (42) of the inner gear (4), the bosses (32) movably engaged with the first protrusions (14) in the base (1) or the second protrusions (23) of the ring member (22).

2. The mechanism as claimed in claim 1, wherein the base (1) has a plurality of recesses (13) defined in the inner periphery of the receiving chamber (11) and communicating with an open end of the base (1), the second protrusions (23) of the ring member (22) engaged with the recesses (13).

* * * * *